United States Patent
Doll et al.

(10) Patent No.: US 9,643,237 B1
(45) Date of Patent: May 9, 2017

(54) COMPOUND DIE FOR DUAL THREAD FORMING

(71) Applicants: Mark Doll, Lincoln, CA (US); Zebula Doll, Lincoln, CA (US)

(72) Inventors: Mark Doll, Lincoln, CA (US); Zebula Doll, Lincoln, CA (US)

( * ) Notice: Subject to any disclaimer, the term of this patent is extended or adjusted under 35 U.S.C. 154(b) by 83 days.

(21) Appl. No.: 14/218,526

(22) Filed: Mar. 18, 2014

Related U.S. Application Data

(60) Provisional application No. 61/803,001, filed on Mar. 18, 2013.

(51) Int. Cl.
*B21H 3/02* (2006.01)
*B21H 3/06* (2006.01)

(52) U.S. Cl.
CPC .............. *B21H 3/06* (2013.01); *B21H 3/02* (2013.01); *B21H 3/025* (2013.01); *B23G 2200/36* (2013.01); *B23G 2200/40* (2013.01)

(58) Field of Classification Search
CPC . B21H 1/18; B21H 3/02; B21H 3/022; B21H 3/025; B21H 3/027; B21H 3/06; B21H 5/027; B21H 7/187; B23G 2200/36; B23G 2200/40; B23G 2210/08
USPC ....... 72/80, 81, 88, 90–92, 94, 95, 102–105, 72/365.2, 469; 470/10, 66, 84, 185
See application file for complete search history.

(56) References Cited

U.S. PATENT DOCUMENTS

| | | | | | |
|---|---|---|---|---|---|
| 3,339,389 | A | * | 9/1967 | Mosow | B21H 3/025 411/334 |
| 3,631,702 | A | * | 1/1972 | Podell | F16B 39/30 72/469 |
| 3,653,241 | A | * | 4/1972 | Orlomoski | F16B 39/30 72/469 |
| 3,800,585 | A | * | 4/1974 | Simons | B21H 3/027 72/469 |
| 4,782,688 | A | * | 11/1988 | Kawashima | F16B 39/30 72/469 |
| 4,862,718 | A | * | 9/1989 | LaCroix | B21H 3/06 72/469 |
| 6,324,887 | B1 | * | 12/2001 | Sharp | B21H 3/06 72/469 |
| 2012/0316000 | A1 | * | 12/2012 | Hettich | B21H 3/02 470/9 |

* cited by examiner

*Primary Examiner* — Peter DungBa Vo
*Assistant Examiner* — Joshua D Anderson
(74) *Attorney, Agent, or Firm* — Heisler & Associate.

(57) ABSTRACT

The compound die includes a working surface with a coarse end for forming coarse threads and a fine end for forming fine threads. The coarse end has coarse crests and coarse roots thereon angled at a coarse thread pitch angle for the screw to be formed. The fine end has fine crests and fine roots formed into a working surface thereof at an angle matching a pitch angle for the fine threads of the screw to be formed. A transition is provided between the coarse end and fine end where each of the coarse roots is aligned with one of the fine roots. A screw such as a bolt is roll formed by first being rolled between a standard die parallel with the compound die and a course end of the compound die, followed by rolling between the standard die and the fine end of the compound die.

13 Claims, 4 Drawing Sheets

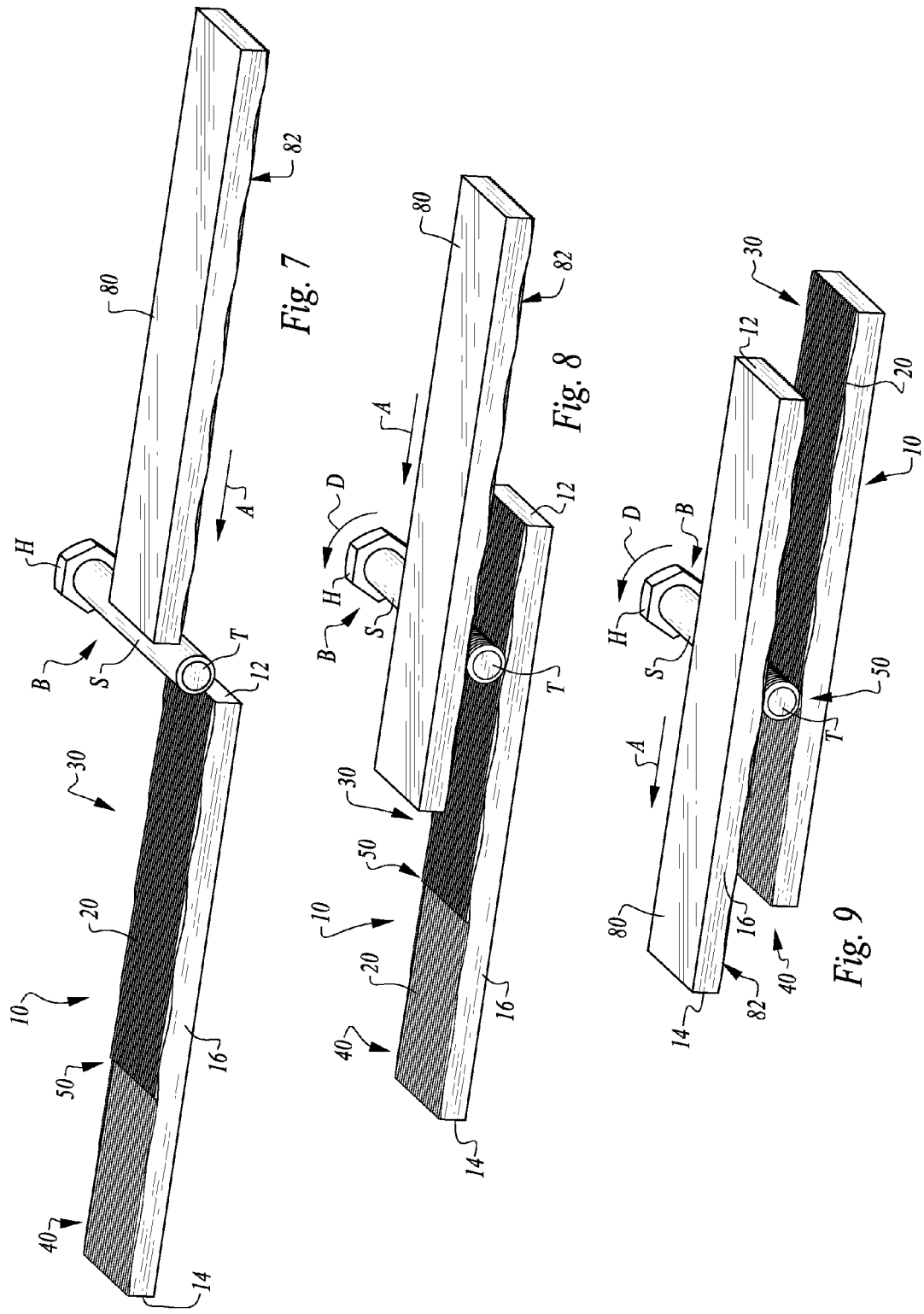

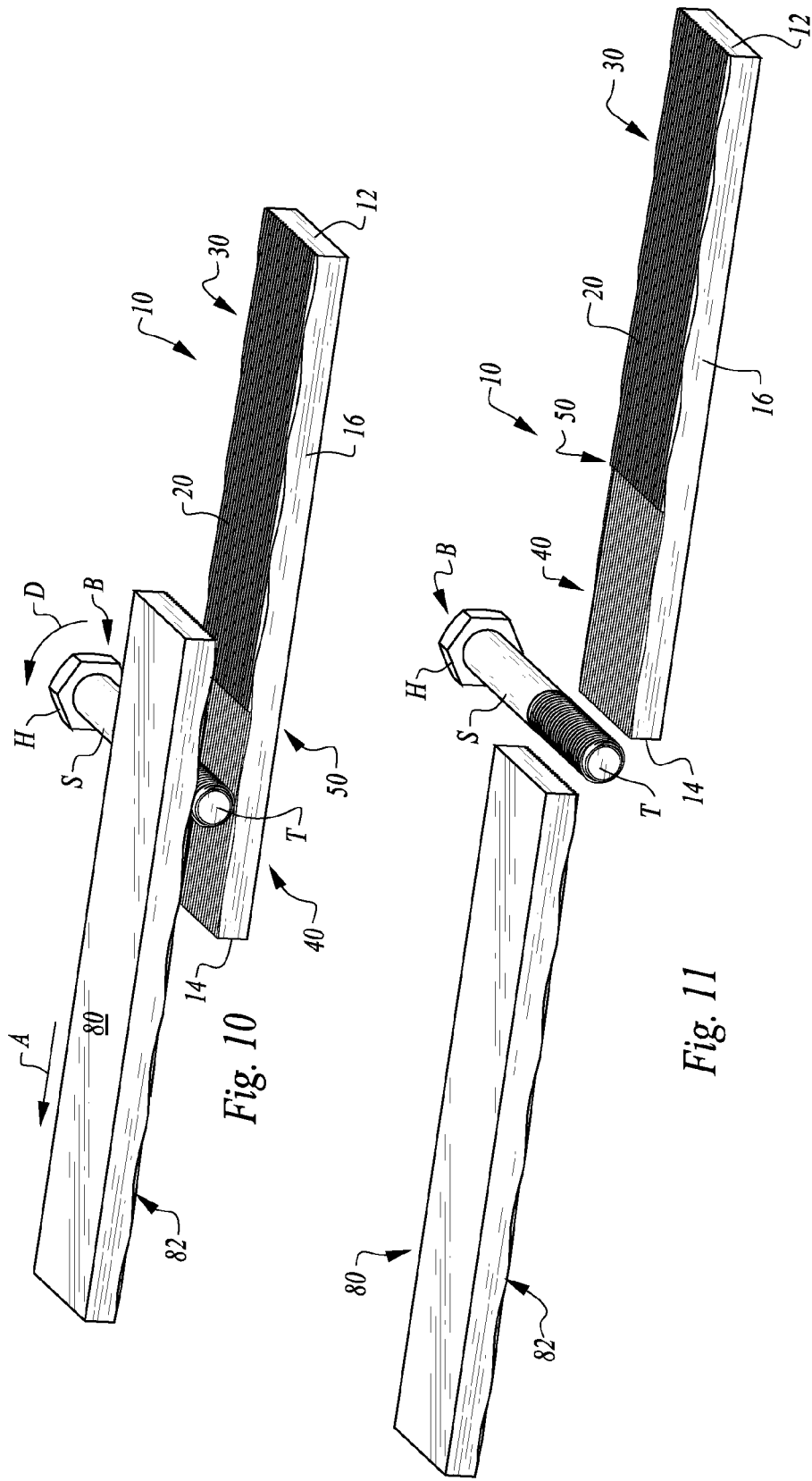

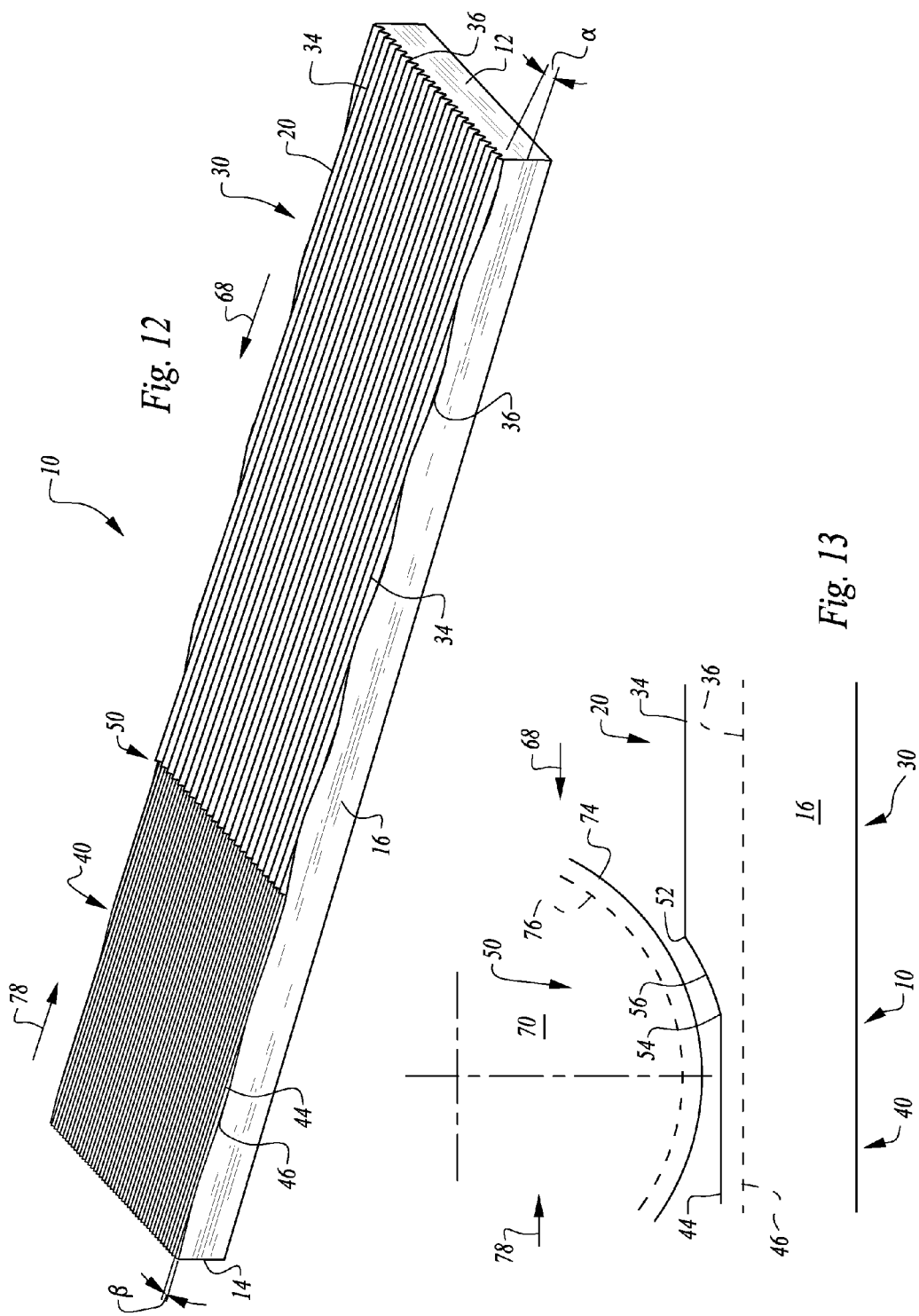

COMPOUND DIE FOR DUAL THREAD FORMING

CROSS-REFERENCE TO RELATED APPLICATIONS

This application claims benefit under Title 35, United States Code §119(e) of U.S. Provisional Application No. 61/803,001 filed on Mar. 18, 2013.

FIELD OF THE INVENTION

The following invention relates to apparatuses and methods for roll forming dual threaded bolts and other screws. More particularly, this invention relates to dies including coarse thread forming structures and fine thread forming structures, so that a screw can be rolled between dies to produce a dual threaded screw.

BACKGROUND OF THE INVENTION

Screws come in a variety of different configurations, generally including threads on a portion of a substantially cylindrical shaft which extends between a head and a tip. One form of screw is configured for use along with a nut or other structure having a threaded hole, which nut threads mate with threads on the screw so that the nut or other threaded structure can be coupled to the screw by simultaneously rotating and translating the shaft into and through the hole in the nut or other threaded hole. When a screw is configured for use with a nut it is often referred to as a bolt.

The threads on the shaft of the screw have a variety of characteristics. Some of these characteristics include a pitch angle which is an angle at which the threads are oriented relative to a plane perpendicular to a central axis of the shaft of the screw. The greater the pitch angle, the greater the axial distance that a nut will travel when rotated a similar number of turns on the screw. Another characteristic of threads is their size, such as measured between a minor diameter and a major diameter of the threads. Threads which are generally larger are often referred to as "coarse threads" while threads which are relatively smaller are often referred to as "fine threads." When adjacent turns of threads are directly adjacent to each other, and when a diameter of the shaft of the screw is known, the pitch angle of the threads and the relative size of the threads become linked together. Coarser threads will have a greater pitch angle and finer threads will have a lesser pitch angle if the diameter of the shaft remains the same and if the threads of adjacent turns are provided without a space therebetween.

One unique type of screw is known in the prior art as a dual threaded screw. Generally, a dual threaded screw has both a coarse thread with a relatively large pitch angle and at least portions of a fine thread having a lesser pitch angle formed on the same screw. Such a dual threaded screw is described in U.S. Pat. No. 7,159,429, incorporated herein by reference in its entirety. A dual threaded bolt B providing one example of such a dual threaded screw is shown herein in FIGS. 1-6. A unique aspect of such a dual threaded bolt B is its ability to have nuts N, L having threads of different pitches both threaded onto the same bolt B with the first nut N providing a basic fastening function, and the second nut L being tightenable against the first nut N to act as a lock nut to keep the nuts N, L from moving relative to the bolt B.

Screws can be manufactured in a variety of different ways including machining of the threads, turning of the threads on a lathe or rolling of the threads between dies. Often, rolling threads onto a screw is the most efficient screw thread forming method. However, dual threaded screws do not lend themselves to straightforward roll forming between appropriately threaded dies. In particular, if one sequentially utilizes coarse threaded dies and then fine threaded dies, one can form the coarse threads onto the screw, but then when the fine threads are formed onto the screw with the fine threaded dies, the coarse threads are to some extent damaged. If the fine threads are first formed onto the shaft of the screw and then the coarse threads are formed, the dies forming the coarse threads will damage the fine threads.

It is taught in the above-identified U.S. Pat. No. 7,159,429 to provide a die having contours thereon which are appropriate to result in the formation of both the coarse thread and the fine thread, simultaneously onto the shaft of the screw. The particular geometry of such a roll forming die is described in U.S. Pat. No. 7,159,429.

While this die geometry for forming the dual threaded screw is disclosed in U.S. Pat. No. 7,159,429, this die geometry is rather complex and is of a character which makes forming of this die exceptionally difficult. This difficulty is enhanced when considering that materials from which roll forming dies are formed must be significantly harder than the material roll formed thereby. Because screws are typically formed of steel or other relatively hard materials, the dies must be formed of exceptionally hard material (e.g. tool steel) and yet must still have the complex geometry necessary to simultaneously form both coarse and fine threads. Harder materials are harder to form into their required shape, for instance requiring grinding instead of cutting.

Accordingly, a need exists for a simpler die and roll forming method to avoid the complex geometry of known dies for roll forming a dual threaded screw.

SUMMARY OF THE INVENTION

With this invention a compound die is provided to facilitate roll forming of bolts or other screws with a dual thread. Both the compound die itself and a method for making the die are disclosed herein. The die is a generally orthorhombic rigid structure formed from a hard tool steel. The orthorhombic structure generally extends in an elongate fashion from a front to a rear between two sides. A working surface is provided facing generally upward. This working surface has two ends including a course end and a fine end. The course end is provided with grooves thereon which cause it to form coarse threads on a shaft of a bolt or other screw when rolled between the compound die and a second die parallel to the compound die. The second die preferably has course threads along an entire extent thereof, from a front to a rear thereof.

Uniquely, the course end of the compound die has course thread forming grooves thereon and the fine end has fine thread forming grooves thereon. A transition zone is also provided between the course end and the fine end. Thus, as a screw is roll formed, it first has the coarse threads formed thereon and then has fine threads formed thereon by the compound die's fine end, while the second parallel die confirms the coarse thread of the screw simultaneously. The course end is provided with course thread forming grooves thereon generally matching a pattern desired for the course threads. This pattern is also matched by the second facing die used with the compound die of this invention in a preferred embodiment.

To form the compound die, first a course grinding wheel is utilized, following known technology to form course threads over half of the extent of a blank being formed into the compound die. For the second facing die, once the course threads have been ground onto the die from a front to a rear, it is complete. For the compound die, after the course threads have been formed by the course grinding wheel of the course end, a fine grinding wheel is utilized. The fine grinding wheel moves in an opposite direction than the course grinding wheel from the rear to a transition at a mid-portion. Where the course grinding wheel extended from the front end of the blank being formed into the compound die, and toward the rear end, the fine grinding wheel begins at the rear end and moves toward the course end, and stops at the transition.

The course grinding wheel and fine grinding wheel also are oriented slightly off from having a rotational axis thereof perpendicular to a long axis of the compound die and perpendicular to the sides. The fine end has its form caused by the fine grinding wheel being angled away from perpendicular to the long axis of the compound die, but by a lesser amount than the course grinding wheel. For instance, if the rotational axis of the course grinding wheel is at ten degrees away from perpendicular to the long axis, the rotational axis of the fine grinding wheel might be angled at five degrees away from a long axis extending between the front end and the rear end of the compound die.

The crests of the fine end of the compound die extend only about half as far away from the root as do the crests of the course thread forming structures at the course end of the compound die. To achieve this varied height, a round grinding of the die to a starting height can first occur before the fine grooves are ground into the fine end of the compound die. In this way, the shaft of a bolt or screw being rolled between two compound die plates is only caused by the fine thread forming structures of the fine end to form small grooves crossing the tips of the course threads.

The transition is caused to be slightly concave at an angle matching a radius R of the fine grinding wheel, and resulting from a position of the trough between ribs in the fine grinding wheel. The grinding wheels are brought together sufficiently far so that the root is substantially continuous between the course end and the fine end. To achieve this, the course grinding wheel is brought to an ending of the transition opposite a beginning of the transition. The length of the die is carefully selected to achieve full forming of the threads. In a preferred form of the invention, this length is sufficient to roll the blank approximately seven times before it reaches the rear of the die. While the die is shown flat, it could alternatively be cylindrical.

OBJECTS OF THE INVENTION

Accordingly, a primary object of the present invention is to provide a method for forming a compound die so that it can be used to roll form a dual threaded screw having both a coarse thread and a fine thread thereon.

Another object of the present invention is to provide an efficient method for making a compound die suitable for roll forming a dual threaded screw and in turn efficiently forming dual threaded screws.

Another object of the present invention is to provide a method for forming a compound die which can roll form a high quality dual threaded screw.

Another object of the present invention is to provide a method for forming a dual threaded die which involves substantially only grinding of a forming surface of the die.

Another object of the present invention is to provide a dual threaded die forming method which can be quickly and easily performed.

Another object of the present invention is to provide a dual threaded die forming method which can achieve high precision in contouring the forming surface of the die.

Another object of the present invention is to provide cutters for use in contouring a forming surface of a dual threaded compound die.

Another object of the present invention is to provide a compound die with coarse thread forming structures at a course end and find thread forming structures at a fine end so that a screw, such as a bolt, can be rolled between two dies including the compound die from the coarse end to the fine end and have both coarse and fine threads formed thereon.

Another object of the present invention is to provide a method for forming a compound die including coarse thread forming structures at a front end and fine thread forming structures at a rear end.

Another object of the present invention is to provide a method for forming a dual threaded screw by rolling the dual threaded screw between a pair of dies including at least one compound die which has coarse thread forming structures at a coarse end and fine thread forming structures at a fine end.

Other further objects of the present invention will become apparent from a careful reading of the included drawing figures, the claims and detailed description of the invention.

BRIEF DESCRIPTION OF THE DRAWINGS

FIGS. 7-11 are perspective views of the compound die of this invention paired with a standard die and a bolt to be formed with dual threads according to this invention, and with the figures showing sequential steps in the process of rolling the bolt between the compound die and a second die to produce the dual threads thereon.

FIG. 12 is a perspective view of the compound die according to a preferred embodiment of this invention.

FIG. 13 is a schematic side elevation view depicting conceptually how cutting tools are used to form the coarse and fine thread forming structures into the compound die, according to one compound die forming method of this invention.

DESCRIPTION OF THE PREFERRED EMBODIMENT

Figure 1:
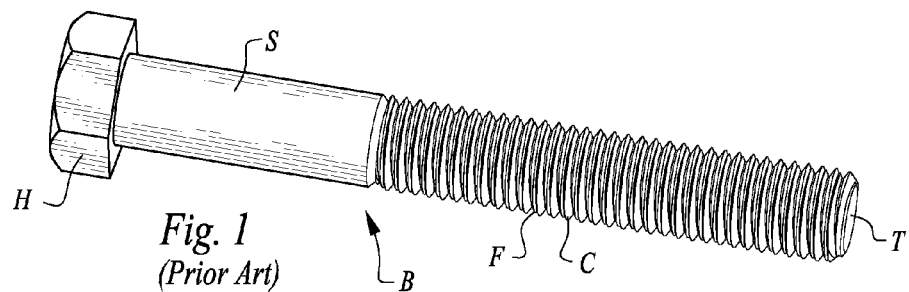
FIG. 1 is a perspective view of a dual threaded bolt defining one form of dual threaded screw formable utilizing the compound die of this invention.
Figure 2:
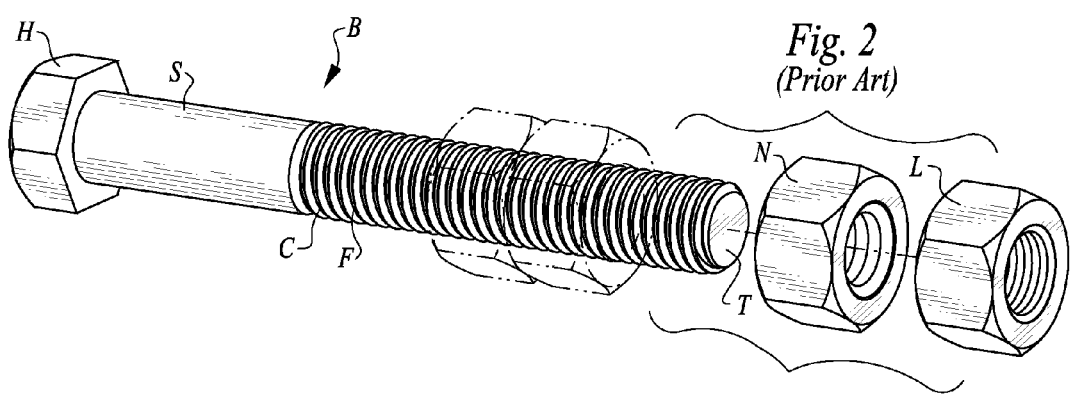
FIG. 2 is a perspective view of that which is shown in FIG. 1 along with a pair of nuts, one having coarse threads and the other fine threads, and both rotatably supportable upon the bolt.
Figure 3:
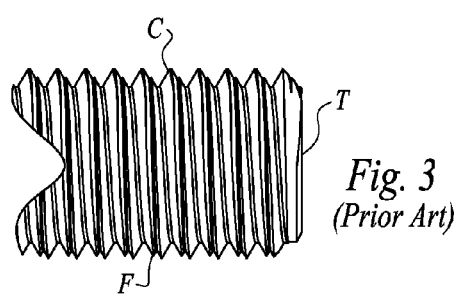
FIGS. 3-6 are side elevation views of the coarse and fine threads which are formed into the bolt by the compound die which is shaped by a method of this invention.
Figure 5:
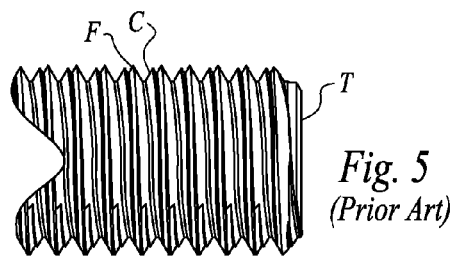
Figure 4:
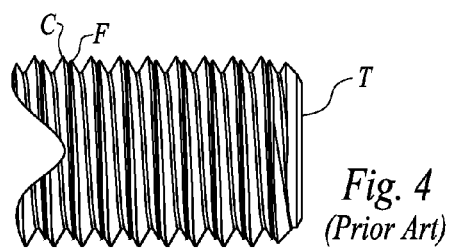
Figure 6:
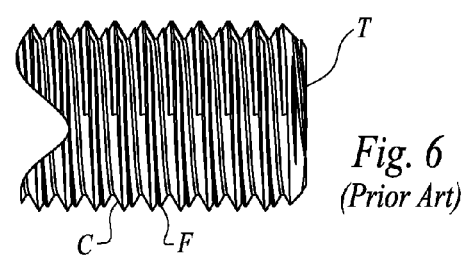

Referring to the drawings, wherein like reference numerals represent like parts throughout the various drawing figures, reference numeral 10 is directed to a compound die for use in forming a dual threaded screw, such as a dual threaded bolt B (FIGS. 1-6). The compound die 10 is used according to a method of this invention along with a second die, such as a standard die 80, with only coarse thread forming structures thereon to roll form the bolt (FIGS. 7-11).

In essence, and with particular reference to FIGS. 12 and 13, basic details of the compound die 10 are described, according to the preferred embodiment of this invention. The compound die 10 includes a working surface 20 shown facing generally upward (FIG. 12). The working surface 20 includes a coarse end 30 and a fine end 40. The coarse end 30 is spaced from the fine end 40 by a transition 50. The coarse end 30 includes coarse thread forming structures thereon and the fine end 40 includes fine thread forming structures thereon. A bolt B (FIGS. 1-6) or other screw can thus be rolled (FIGS. 7-11) between the compound die 10 working surface 20 and a second die, such as the standard die 80 with only coarse thread forming structures thereon. The bolt B is first rolled between the coarse end 30 of the compound die 10 and the standard die 80 to form coarse threads onto the bolt B, and then is rolled between the fine end 40 of the compound die 10 and the standard die 80 to form the fine threads onto the bolt B.

Preliminarily, and with reference to FIGS. 1-6, basic details of the dual threaded bolt B are described, defining one embodiment of a dual threaded screw formable by roll forming with a die such as the compound die 10 described herein. The dual threaded bolt B is characterized by having both a coarse thread C and a fine thread F on a common shaft S extending between a head H and a tip T of the bolt B. The coarse thread C and fine thread F each have pitch angles associated therewith which differ from each other. As an example, the coarse thread C might have a pitch angle of 10° and the fine thread F might have a pitch angle of 5°. Most typically, the coarse thread C will have a pitch angle which matches some standard in the art for coarse threaded bolts. The fine thread F will then have a pitch angle (also called a "helix angle") which is exactly a whole fraction (typically half) of the pitch angle of the coarse thread C.

A nut N is provided with a female coarse thread matching the coarse thread C on the dual thread bolt B. A lock nut L is provided with a fine female thread which matches the fine thread F on the dual threaded bolt B. The female threads of the nut N coact with the coarse thread C on the dual threaded bolt B to advance the nut N, by rotation along a central axis of the shaft S. The lock nut L has its fine female threads coact with the fine threads F which are formed into portions of the coarse threads C so that the lock nut L can also advance by rotation along the central axis of the shaft S.

A similar number of turns for the nut N and the lock nut L will cause the nut N to advance twice as far as the lock nut L. When the lock nut L is advanced toward the nut N while the nut N is stationary, the lock nut L will tighten against the nut N and tend to cause both the nut N and lock nut L to both be securely held to the shaft S of the bolt B. Further details of such a bolt B are described in U.S. Pat. No. 7,159,429, incorporated herein by reference.

More specifically, and with particular reference to FIGS. 12 and 13, particular details of the compound die 10 are described, according to this most preferred embodiment. The compound die 10 is a rigid mass of roll forming die material such as tool steel. The compound die 10 has a basic orthorhombic shape including a front 12 opposite a rear 14 which are preferably planar and substantially parallel to each other and define two small surfaces of the compound die 10. A pair of sides 16 extend from the front 12 to the rear 14 and are parallel to each other on opposite lateral sides of the compound die 10. A planar working surface 20 extends from the front 12 to the rear 14 and between the sides 16. This working surface 20 is shown facing upward in FIG. 12, but could face downward or in some other direction, but generally parallel with a second die between which a bolt B or other screw is roll formed. The second die is most preferably a standard die 80 (FIGS. 7-11) having a similar shape as the compound die 10, but with a working surface 82 having only coarse thread forming structures thereon. These coarse thread forming structures would be similar to those at the coarse end 30 of the working surface 20 of the compound die 10, but extending entirely from a front to a rear of the working surface 82 of the standard die 80. As a second alternative, a pair of compound dies 10 could be utilized. However, it is preferable that a standard die 80 be used with the compound die 10, so that the coarse thread forming structures on the working surface 82 of the standard die 80 can confirm the coarse threads on the bolt B while the fine threads are being formed by the fine end 40 of the compound die 10 near the end of the forming process for each bolt B.

The coarse end 30 of the compound die 10 is adjacent the front 12. This coarse end 30 includes coarse thread forming structures including coarse crests 34 and coarse roots 36. The coarse crests 34 and coarse roots 36 have an alternating pattern between the sides 16, with each of the coarse crests 34 and coarse roots 36 extending from the front 12 to the transition 50 between the coarse end 30 and the fine end 40. The coarse crests 34 have a height similar to a difference between the major diameter and minor diameter for the coarse threads of the bolt B (FIGS. 1-6).

The coarse crests 34 and coarse roots 36 are parallel to each other but angled relative to the sides 16 at a pitch angle α. In one simple embodiment the pitch angle α is 10°, but could differ based on the performance characteristics desired for the bolt B. While the coarse crests 34 and coarse roots 36 are preferably angled at this pitch angle α it is conceivable that the coarse crests 34 and coarse roots 36 could have an angle away from the sides S different from a pitch angle for the bolt B coarse threads, and that the bolt B would be rolled against the compound die about a rolling axis non-perpendicular to the planes in which the sides 16 are oriented.

The fine end 40 of the compound die 10 extends from the rear 14 to the transition 50 and between the two sides 16. The fine end 40 includes fine end forming structures extending from the working surface 20, which include fine crests 44 and fine roots 46. The fine crests 44 and fine roots 46 alternate with the fine crests 44 extending up from the working surface 20 by a distance similar to a depth of the fine threads in the dual threaded bolt B (FIGS. 1-6).

The fine crests 44 and fine roots 46 are preferably parallel with each other and angled relative to the sides 16 by a pitch angle β. Thus, when the bolt B is roll formed against the compound die 10, the fine thread forming structures at the fine end 40 cause the fine threads to be formed at a fine thread pitch angle β. This fine pitch angle β is a whole fraction (typically half) of the coarse pitch angle α on the coarse end 30. For instance, if the coarse thread pitch angle α is 6°, the fine thread pitch angle β might be 2° or 3°.

The fine crests 44 preferably extend away from the working surface 20 to a height which is half of a height of the coarse crests 34, so that the fine threads of the bolt B cut into the coarse threads of the bolt B about half of a height of the coarse threads of the bolt B. Other depths could be provided by having the fine threads 40 be shorter or taller than the fifty percent height shown in this embodiment.

Most preferably, the fine roots 46 extend from the working surface 20 a distance similar to the coarse roots 36 at the coarse end 30. Thus, the coarse roots 36 and fine roots 46 are all in a common plane. The fine crests 44 preferably number an amount twice that of the coarse crests 34. The coarse roots 36 preferably each line up with one of the fine roots 46 at the transition 50. In this way, with each of the coarse roots 36 aligned with one of the fine roots 46 of the transition 50, every other fine root 46 will be aligned with one of the coarse crests 34, because there are twice as many fine crests 44 as coarse crests 34.

The transition 50 can have a variety of different configurations but is most preferably configured to avoid doing irreparable damage to the threads being formed onto the bolt B for the instant that the bolt B is passing over the transition 50, and to also facilitate the transition 50 and portions adjacent thereto being relatively easy to form into the working surface 20 of the compound die 10 during manufacture of the compound die 10. In this preferred embodiment, the transition 50 is not a single point but rather defines a region extending between a beginning 52 and an ending 54. The beginning 52 is closer to the front 12 and the ending is closer to the rear 14. This transition 50 is characterized by a concave surface 56 generally extending from the fine crests 44 up to the coarse crests 34. A radius of curvature of this concave surface 46 is preferably similar to a radius of curvature of circular cutting or grinding tools used to form at least the fine thread forming structures including the fine crests 44 and fine roots 46.

With particular reference to FIG. 13, details of a method for forming the compound die 10 are described, according to an exemplary embodiment. First a mass of material is identified which has a basic geometry similar to that of the compound die 10 with a large planar working surface 20. This initial surface would typically have no thread forming structures thereon in the beginning. A coarse end forming tool then passes from the front 12 to the transition 50 over the coarse end 30. In one embodiment, the coarse end 30 forming tool is a grinding wheel with a series of ribs and troughs therein with the ribs sized to form the coarse roots 36 and the troughs sized to form the coarse crests 34.

As an alternative, the coarse end forming tool could be in the form of a cutter having a circular perimeter with teeth extending radially therefrom, the teeth sized to form the coarse roots 36. Multiple passes of such a tool would form each of the coarse roots 36 and leave the coarse crests 34 therebetween. Alternatively, a cutter could be provided with multiple sets of cutting teeth parallel to each other to simultaneously form multiple coarse roots 36 and leave coarse crests 34 therebetween.

The coarse end forming tool extends along a coarse forming direction 68 extending from the front 12 to the transition 50. In particular, this coarse end 30 forming tool extends through the transition 50 to the ending 54. The coarse end 30 forming tool is angled as it forms the coarse crests 34 and coarse roots 36 so that the coarse crests 34 and coarse roots 36 exhibit the coarse pitch angle α desired for the bolt B to be roll formed by the compound die 10.

To form the fine thread forming structures in the fine end 40, a fine thread forming tool is utilized on the fine end 40. However, this step is preferably preceded by a rough grinding step where a plane cylindrical grinding tool is utilized to grind the fine end 40 from the rear 14 to the transition 50 to cut into the working surface 20 down to the tips of the fine crests 44. This rough grinding step saves the fine end 40 forming tool from having to remove this excess material.

The fine end 40 forming tool is preferably in the form of a fine grinding wheel 70 having alternating parallel ribs 74 and troughs 76 formed thereon. The ribs 74 are sized to form the fine roots 46 into the fine end 40. As an alternative to the fine grinding wheel 70, a cutter having a circular perimeter and with teeth extending radially therefrom could be provided with tips of the teeth shaped to form the fine roots 46 therein. Multiple passes of such a cutting tool over the fine end 40 could provide adjacent fine roots 46 and leave the fine crests 44 therebetween. As an alternative, a cutter with multiple circular tools rotating on a common shaft could simultaneously cut multiple fine roots 46 into the fine end 40.

The fine end 40 forming tool passes in a fine forming direction 78 from the rear 14 to the transition 50. At the transition 50, the fine forming tool 70 could stop at the ending 54, or could continue all the way to the beginning 52 of the transition 50, but with elevating of the fine forming tool as it passes over the transition 50. Because the transition 50 defines only a small portion of the overall extent of the compound die 10, the transition 50 is configured primarily to only avoid doing irreparable damage to the threads being formed onto the bolt B, during the instant that the bolt B is at the transition 50.

The fine forming tool, such as the fine grinding wheel 70 is angled relative to the sides 16 by a fine pitch angle β so that when the fine forming tool 70 passes over the fine end 40, the fine crests 44 and fine roots 46 exhibit this fine pitch angle β, which is preferably half of the coarse pitch angle α of the coarse end 30. With the completion of the forming of the fine thread forming structures in the fine end 40, the compound die 10 is complete.

The compound die 10 is then ready for use along with a standard die 80 for roll forming of a dual threaded bolt B, such as depicted in FIGS. 7-11. Initially, the bolt B is roll formed between the coarse end 30 of the compound die 10 and the standard die 80 (FIGS. 7-9). This causes the bolt B to have only coarse threads formed upon the shaft S thereof. Next, after the bolt B passes through the transition 50, the bolt B is rolled between the fine end 40 of the compound die 10 and the standard die 80 (FIGS. 9-11). The fine end 40 of the compound die 10 causes the fine threads to be formed into the bolt B. Because the standard die 80 is present opposite the fine end 40 of the compound die 10, the working surface 82 of the standard die 80 confirms the coarse threads on the bolt B as the fine threads are formed onto the bolt B by cutting into the coarse threads somewhat.

Most preferably, the fine end 40 has a length from the transition 50 to the rear 14 so that the bolt B is rolled seven full turns between the fine end 40 and the standard die 80. At a minimum, at least five turns of the bolt B between the fine end 40 of the compound die 10 and the standard die 80 are provided. Once the bolt B has completed passage over the compound die 10 to the rear 14, the bolt B has completed the process of having the dual threads formed thereon. The compound die 10 and standard die 80 can then be utilized with a second bolt B to form dual threads thereon.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A compound die for forming a dual threaded screw, the compound die comprising in combination:
   a working surface extending between a front and a rear, and between two sides;
   said working surface including a coarse end with coarse crests and coarse roots adjacent said front;
   said working surface including a fine end with fine crests and fine roots adjacent said rear;

said fine crests extending up from said working surface less than said coarse crests;
said fine end is closer to said rear than said coarse end; and
wherein said coarse end has a pitch angle that said coarse crests diverge from said sides defining the pitch angle for said coarse end, and said fine crests of said fine end are angled relative to said sides at a pitch angle of said fine end, said coarse end pitch angle twice said fine end pitch angle, wherein the pitch angle of the coarse crests of said coarse end is constant for all of said coarse end and the pitch angle for said fine crests of said fine end is constant for all of said fine end.

2. The compound die of claim 1 wherein said fine roots extend from said working surface a similar distance as said coarse roots.

3. The compound die of claim 1 wherein a transition exists between said coarse end and said fine end where said working surface transitions from said coarse crests and said coarse roots to said fine crests and said fine roots.

4. The compound die of claim 3 wherein said transition includes each of said coarse roots of said coarse end aligned with a different one of said fine roots of said fine end.

5. The compound die of claim 4 wherein said transition includes a concave slope extending from said coarse crests to said fine crests.

6. The compound die of claim 5 wherein said coarse roots of said coarse end extend to an end of said concave slope closest to said rear.

7. The compound die of claim 5 wherein said coarse roots and said fine roots have a common depth through said transition.

8. The compound die of claim 1 wherein said fine end has twice as many crests as said coarse end extending between said sides.

9. The compound die of claim 1 wherein said fine end extends a lesser distance from said rear than said coarse end extends from said front.

10. The compound die of claim 9 wherein said fine end has a length from a transition to said rear of about seven times a circumference of a screw to be formed by said compound die.

11. A compound die for forming a dual threaded screw, the compound die comprising in combination:
a working surface extending between a front and a rear, and between two sides;
said working surface including a coarse end with coarse crests and coarse roots adjacent said front;
said working surface including a fine end with fine crests and fine roots adjacent said rear;
said fine crests extending up from said working surface less than said coarse crests;
said fine end is closer to said rear than said coarse end;
wherein said coarse end has a pitch angle that said coarse crests diverge from said sides defining the pitch angle for said coarse end, and said fine crests of said fine end are angled relative to said sides at a pitch angle of said fine end, said coarse end pitch angle twice said fine end pitch angle, wherein the pitch angle of the coarse crests of said coarse end is constant for all of said coarse end and the pitch angle for said fine crests of said fine end is constant for all of said fine end;
wherein a transition exists between said coarse end and said fine end where said working surface transitions from said coarse crests and said coarse roots to said fine crests and said fine roots; and
wherein said transition includes a concave slope extending from said coarse crests to said fine crests.

12. The compound die of claim 11 wherein said transition includes a region between a beginning and an ending, said beginning closer to said front than said ending, said beginning having crests and roots and with said ending having crests and roots with said crests of said beginning extending up from said roots of said beginning more than said crests of said ending extend up from said roots of said ending, said beginning and said ending having roots of similar depth.

13. The compound die of claim 12 wherein said beginning includes an abrupt change from the pitch angle of said crests of said front to said crests of said transition, while said ending includes a smooth change of the pitch angle between said crests of said transition and said crests of said rear.

* * * * *